(12) United States Patent  
Tanuma et al.

(10) Patent No.: US 11,443,564 B2  
(45) Date of Patent: Sep. 13, 2022

(54) VEHICLE MANAGEMENT SYSTEM, VEHICLE MANAGEMENT DEVICE, AND VEHICLE MANAGEMENT METHOD

(71) Applicant: Hitachi, Ltd., Tokyo (JP)

(72) Inventors: Iwao Tanuma, Tokyo (JP); Shuji Soga, Tokyo (JP); Noriyuki Haga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 421 days.

(21) Appl. No.: 16/654,074

(22) Filed: Oct. 16, 2019

(65) Prior Publication Data

US 2020/0126320 A1   Apr. 23, 2020

(30) Foreign Application Priority Data

Oct. 19, 2018 (JP) .............................. JP2018-197520

(51) Int. Cl.
```
G07C 5/00      (2006.01)
G07C 5/08      (2006.01)
G06Q 10/00     (2012.01)
```
(52) U.S. Cl.
CPC ............. *G07C 5/006* (2013.01); *G06Q 10/20* (2013.01); *G07C 5/008* (2013.01); *G07C 5/0808* (2013.01); *G07C 5/0841* (2013.01)

(58) Field of Classification Search
None
See application file for complete search history.

(56) References Cited

FOREIGN PATENT DOCUMENTS

| JP | 2002-245376 A | 8/2002 |
| JP | 2011-204156 A | 10/2011 |
| KR | 100252300 B1 | * 12/1997 |
| KR | 19990052052 A | * 12/1997 |
| KR | 20020053344 A | * 12/2000 |
| KR | 20170096436 A | * 2/2016 |

* cited by examiner

*Primary Examiner* — Abdhesh K Jha  
(74) *Attorney, Agent, or Firm* — Mattingly & Malur, PC (57) ABSTRACT

The vehicle management system is configured with a detection unit to detect work related to maintenance for a vehicle based on vehicle information related to the vehicle, a specifying unit to specify predetermined work out of the work detected by the detection unit, based on work information specifying the predetermined work that even a person who is not a mechanic of the vehicle can perform, and an output unit to output information indicative of the work specified by the specifying unit.

6 Claims, 7 Drawing Sheets

| *VEHICLE ID | VEHICLE TYPE | START OF OPERATION | STATIC INFORMATION 1 | ... | STATIC INFORMATION N |
|---|---|---|---|---|---|
| 001 | CAR 1 | 2013/04/01 | TRUE | ... | 1 |
| 002 | CAR 2 | 2013/01/01 | FALSE | ... | 2 |
| 354 | CAR 3 | 2018/03/21 | FALSE | ... | 2 |
| 355 | CAR 7 | 2018/04/01 | TRUE | ... | 8 |

FIG. 3

| VEHICLE ID | TIME STAMP | TOTAL MILEAGE | ... | ENGINE TEMPERATURE | CODE 1 | ... | CODE N |
|---|---|---|---|---|---|---|---|
| 001 | 2013/04/03 16:00 | 0 | | 50 | FALSE | | FALSE |
| 001 | 2013/04/03 16:01 | 0 | | 60 | FALSE | | FALSE |
| 355 | 2018/05/01 07:11 | 400 | | 72 | FALSE | | FALSE |

Columns 303 VEHICLE MEASUREMENT DATA and 304 ERROR CODE.

FIG. 4

| *WORK ID | WORK NAME | WORK CONTENTS | REWARD |
|---|---|---|---|
| T001 | LEGAL CHECK | VEHICLE IS CONVEYED TO MAINTENANCE SHOP..... | 3000 |
| T532 | TIRE CONFIRMATION | PARKED VEHICLE IS ..... | 300 |

VEHICLE MANAGEMENT SYSTEM, VEHICLE MANAGEMENT DEVICE, AND VEHICLE MANAGEMENT METHOD

CROSS-REFERENCE TO RELATED APPLICATION

The present application claims priority from Japanese application JP 2018-197520, filed on Oct. 19, 2018, the contents of which is hereby incorporated by reference into this application.

TECHNICAL FIELD

The present invention relates to the technology of managing the work related to maintenance of a vehicle.

BACKGROUND ART

In recent years, the car sharing market is expanding at a rapid rate. When many users utilize one vehicle, the rate of operation per vehicle improves, compared with the case where only one person utilizes the vehicle. Therefore, compared with the past, the ratio of operation costs such as a cost on maintenance work to the lifetime costs for one vehicle increases, and consequently, the demand of the maintenance work also increases.

On the other hand, the number of mechanics who bear maintenance work is decreasing. Moreover, there is anxiety about the shortage of mechanics who can support new technology related to vehicles such as an electric vehicle. While the demand of the maintenance work increases, mechanics decrease in number, causing anxiety about the shortage of the mechanics who can support the maintenance work. Therefore, important issues are improvement of the productivity and mitigation of the maintenance work.

According to this point, the technology is disclosed in which, corresponding to attendance situation and working efficiency of each mechanic, the load of the mechanic is smoothed in every time zone every day from the stage of a loading reservation, and accordingly uniform service is provided for all the customers (refer to Patent Literature 1).

Moreover, the technology regarding the vehicle rental system is disclosed in which vehicles are allocated so that the periodic check time of a vehicle and the component wear-and-tear time may be synchronized, and in which the wastefulness of the components and the work is decreased, ensuring the rate of operation of the vehicle (refer to Patent Literature 2).

CITATION LIST

Patent Literature (Patent Literature 1) Japanese Unexamined Patent Application Publication No. 2011-204156
(Patent Literature 2) Japanese Unexamined Patent Application Publication No. 2002-245376

SUMMARY OF INVENTION

Technical Problem

However, the technology disclosed in Patent Literature 1 and the technology disclosed in Patent Literature 2 cannot cope with the problem that mechanics who are short in number need to check the current state frequently and need to spare time for work other than professional work.

The present invention is made in consideration of the above point and proposes a vehicle management system for example that can mitigate the work to be performed by a mechanic.

Solution to Problem

In order to solve this problem, the present invention provides a detection unit to detect work related to maintenance of a vehicle based on vehicle information related to the vehicle; a specifying unit to specify predetermined work out of the work detected by the detection unit, based on work information specifying the predetermined work that even a person who is not a mechanic of the vehicle can perform; and an output unit to output information indicative of the work specified by the specifying unit.

According to the configuration, the work that can be performed by even a person who is not a mechanic of a vehicle is outputted out of the work related to the maintenance. Therefore, for example, other persons can perform the outputted work on behalf of the mechanic, thereby mitigating the work to be performed by the mechanic.

Advantageous Effects of Invention

According to the present invention, it is possible to realize a vehicle management system with high sustainability.

DESCRIPTION OF EMBODIMENTS

With reference to the drawings, the following explains one embodiment of the present invention in full detail. It should be noted that the present invention is not limited to the following embodiment, but includes configurations with various modifications within the limits of the present invention.

The following explains mainly the configuration to solve such a problem that mechanics who maintain vehicles (such as an automobile, a motor bicycle, and a bicycle) are forced to spend time for work other than professional work, in spite of the shortage of the mechanics. However, the embodiment also includes a configuration that solves the following problems, for example.

In the case where the vehicle is an automobile, for example, it is necessary to move the vehicle from the present location to a maintenance shop. When a mechanic is in charge of the movement, the movement also takes time, and the round trip time of the movement causes economical loss. The energy required for the movement related to the mechanic also becomes wasteful.

In view of such a problem, in the present invention, for example, sensor data of a vehicle is monitored and a maintenance history up to now is accumulated. By threshold value processing of the data concerned, it is detected whether the work related to maintenance (such as confirmation of current condition, vehicle washing, cleaning of vehicle interior, check, inspection, maintenance, and repair) is required, and auxiliary work of the mechanic (for example, work of movement) is selectively specified out of the work for which maintenance is needed.

The conventional work of mechanics includes work that even a person who is not a mechanic (for example, a user) can perform and that does not require professional knowledge and/or professional equipment (general work), such as confirmation work on wearing out of a tire, confirmation work on an interior/exterior system, confirmation work of the part where abnormalities have been detected, daily check, cleaning of a vehicle, and supply of gasoline. Therefore, the problem is that the mechanic is forced to spare time for such work.

In view of such a problem, in the present invention, for example, the work that even a user can perform and that professional knowledge and/or professional equipment are not required is specified selectively out of the work for which maintenance is needed.

The conventional work of mechanics includes work that even a person who is not a mechanic can perform and that uses facilities such as equipment and a device loaded in a vehicle (data collection work), such as collection of the operation data while the vehicle is running. Therefore, the problem is that the mechanic is forced to spare time for such work.

In view of such a problem, in the present invention, for example, out of the work for which maintenance is needed, the work that even a user can perform and the work that uses the facilities loaded in the vehicle is specified selectively.

There is concern that the spread of share cars (specific automobiles that are used by members communally) leads to the fall of consciousness of the user to the management of the automobile.

In view of such a problem, in the present invention, for example, the guidance (explanation) related to the selectively specified work is presented to the user. For another example, the selectively specified work is entrusted to a user (the user is confirmed whether to substitute and perform the selectively specified work). For yet another example, rewards (such as money, goods, and a point) are given to those who perform the work.

Hereinafter, the details are explained.

(1) First Embodiment (A) System Configuration

Figure 1:
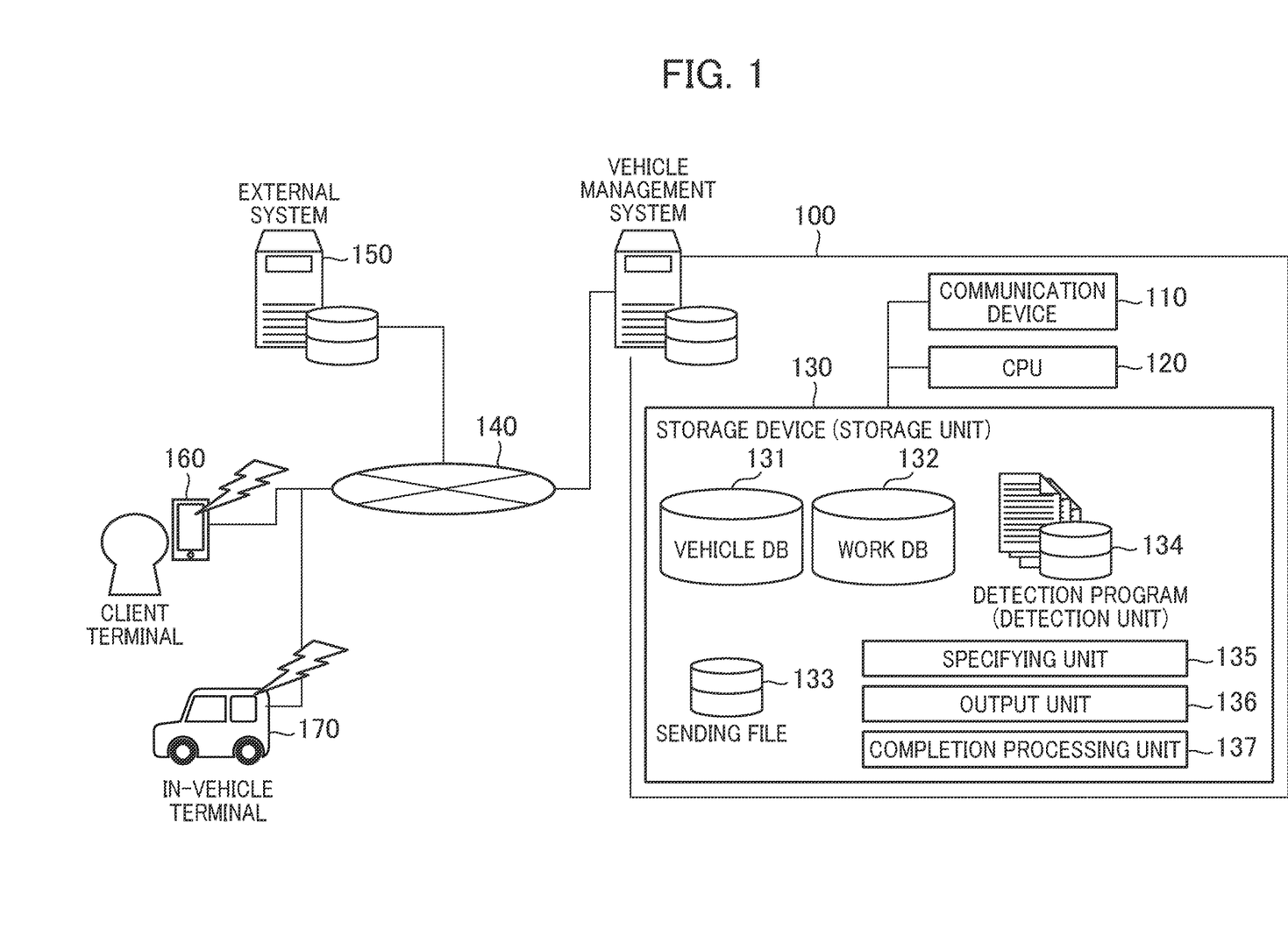
FIG. 1 is a drawing illustrating an example of a configuration of a vehicle management system according to a first embodiment.

In FIG. 1, the symbol 100 indicates a vehicle management system according to the first embodiment as a whole. FIG. 1 illustrates an example of a configuration of a vehicle management system 100. The vehicle management system 100 monitors or accumulates data such as sensor data of a vehicle as a management object and maintenance history data up to now. By the arithmetic and threshold value processing by inputting the data concerned, the vehicle management system 100 detects whether work such as confirmation of current condition and keeping up is required and specifies the work that requires maintenance.

The vehicle management system 100 is a computer system and identifies selectively, out of the work requiring maintenance to the vehicle as the management object, general work (more specifically, for example, work that can be performed without qualification and work that is not necessary to look at an inside by decomposing, or that is not necessary to lift and to look at the bottom of a vehicle), data collection work (more specifically, work to measure data when driving a vehicle under the specified conditions), and auxiliary works, such as movement. Then, the vehicle management system 100 performs various kinds of arrangement processing required for practice of the selectively specified work. When put in another way, by specifying selectively plain work, and arranging for a user to perform the selectively specified work and arranging for a mechanic to perform the very professional work, it is possible to improve the productivity of the mechanic and to reduce the energy loss in the society as a whole.

Furthermore, the vehicle management system 100 is a computer system and receives a notice indicative of the completion of performing the maintenance and performs update processing of a database (DB) corresponding to the contents of the received notice, when the work related to the maintenance to the vehicle as the management object is performed by a person who is not a mechanic (the person may be a user of the vehicle, or may be a person who wants to acquire a reward, or may be another person, and hereinafter, the person is written as a user).

The vehicle management system 100 is configured with a communication device 110, a CPU 120, and a storage device 130 (an example of a storage unit). The vehicle management system 100 is coupled with a network 140 via a communication device 110 and performs data communications with each of an external system 150, a client terminal 160, and an in-vehicle terminal 170.

It is assumed, for example, that the vehicle management system 100 collects the data of the vehicle to be managed from the in-vehicle terminal 170, determines the necessity for the work related to the maintenance, presents a vehicle requiring the work and the work to the client terminal 160, communicates with the external system 150 that makes a link in performing the work, and receives a notice that the work has been performed from the client terminal 160 and/or the external system 150.

The communication device 110 is coupled with the network 140 and performs communications processing with other equipment (such as the external system 150, the client terminal 160, and the in-vehicle terminal 170). The CPU 120 is a processing unit, performs the overall control of the system itself, and performs various kinds of arithmetic processing and control processing. The storage device 130 is configured with proper memory elements, such as a hard disk drive and a memory, and stores various kinds of information (including a vehicle DB 131, a work DB 132, a sending file 133, and a program).

The function of the vehicle management system 100 (such as the detection unit 134, the specifying unit 135, the output unit 136, the completion processing unit 137) may be realized, for example, by the CPU 120 reading a program from the storage device 130 and running it (software), by hardware such as an exclusive-use circuit, or by combining the software and the hardware. The function of the vehicle management system 100 may be realized by one computer or may be realized by multiple computers.

Data (for example, a DB) stored in the storage device 130 is referred to and edited, for example, by the specifying unit 135, the output unit 136, the completion processing unit 137, and the external system 150 that are described above.

The external system 150 performs, for example, arrangements of the various resources corresponding to the request (instructions) from the vehicle management system 100, and the processing to notify to the vehicle management system 100 that the work has been performed. Only one external system 150 is illustrated in the configuration illustrated in FIG. 1. However, it is also preferable to adopt the configuration in which multiple external systems are coupled with the network 140.

The external system 150 includes a reservation system of a maintenance shop, provided with the interface such as an API (Application Programming Interface) that communicates with the vehicle management system 100, a reward provision system to the work to the user of a vehicle, and a work support software distribution system for the client terminal 160 or the in-vehicle terminal 170.

The client terminal 160 performs various kinds of processing such as processing to display the data obtained from the vehicle management system 100 on a display for example, via an I/O interface such as a keyboard, a mouse, a touch panel, and a display (such as processing for enabling the confirmation of a vehicle that requires work, and processing related to the procedure for performing work), processing to transmit the information on completion to the vehicle management system 100 when the work is completed, and processing to collect the data using sensors, such as a camera, and to transmit the data to the vehicle management system 100. In the configuration illustrated in FIG. 1, only one client terminal 160 is illustrated. However, it is also preferable to adopt a configuration in which multiple client terminals are coupled to the network 140.

The in-vehicle terminal 170 performs processing such as transmitting to the vehicle management system 100 various kinds of operation information, sensor data, and an error code, acquired from the vehicle to which the in-vehicle terminal 170 is coupled, and writing them to the vehicle DB 131. In the configuration illustrated in FIG. 1, only one in-vehicle terminal 170 is illustrated. However, it is also preferable to adopt a configuration in which multiple in-vehicle terminals are coupled to the network 140. In addition to the above-described configuration, the in-vehicle terminal 170 may have the same configuration as the client terminal 160 (for example, a car-navigation system may perform the function of the client terminal 160).

(B) Functional Configuration

Next, the function provided in the vehicle management system 100 is explained.

The detection unit 134 detects the work related to the maintenance to a vehicle based on the vehicle information (for example, the vehicle DB 131) related to the vehicle. For example, the detection unit 134 inputs multiple tables and multiple records in the vehicle DB 131 and the sending file 133, and determines whether the numerical value calculated based on the input concerned exceeds a fixed threshold value. The detection unit 134 may be provided for every function (multiple detection units may be mounted).

The specifying unit 135 specifies predetermined work out of the work detected by the detection unit 134, based on the work information (for example, the work DB 132) specifying the predetermined work (for example, the general work, the data collection work, and the auxiliary work) that can be performed by even a person who is not a mechanic of a vehicle. For example, when the detection is performed by the detection unit 134, by executing (calling) the detection unit 134 and referring to the work DB 132, the specifying unit 135 specifies the work that a user can perform, from one or more pieces of work detected by the detection unit 134, and stores the specified work to the vehicle DB 131.

The output unit 136 outputs the information (such as a work ID, a work name, work contents, and a user interface) that indicates the work specified by the specifying unit 135. For example, with reference to the vehicle DB 131, the output unit 136 provides the client terminal 160 with the user interface for the operation with which the user performs selection whether to perform the work specified by the specifying unit 135. For example, by referring to the work DB 132, the output unit 136 specifies the process (processing) to be performed by persons other than the user depending on the selected work when the selection is performed, and transmits the request for execution of the process to the external system 150.

The completion processing unit 137 receives the information (for example, the sending file 133) indicative of the completion of the work specified by the specifying unit 135, and stores the received information. For example, the completion processing unit 137 receives a notice that the work has been actually performed from the external system 150, the client terminal 160, or the in-vehicle terminal 170, and updates the vehicle DB 131 (information about the implementation states of the accumulated work).

(C) Data Structure

Next, the data (the vehicle DB 131 and the work DB 132) included in the vehicle management system 100 is explained.

The vehicle DB 131 is a DB accumulating static information associated with a vehicle, such as the operation start time of a vehicle as a management object, operation information, work history information, and information associated with a vehicle such as work requiring maintenance. More specifically, the vehicle DB 131 includes a vehicle table 200, an operation information table 300, a work history table 500, and a required work table 700.

The work DB 132 is a DB accumulating information specifying work that is related to maintenance of a vehicle and that the user can perform, information on the detection program that detects the necessity of work, information associating the detection contents with the work, and information for making cooperation with the external system 150. More specifically, the work DB 132 includes a work contents table 400, a detection program table 600, a detection contents versus work table 800, and an external cooperation table 900.

Figure 2:
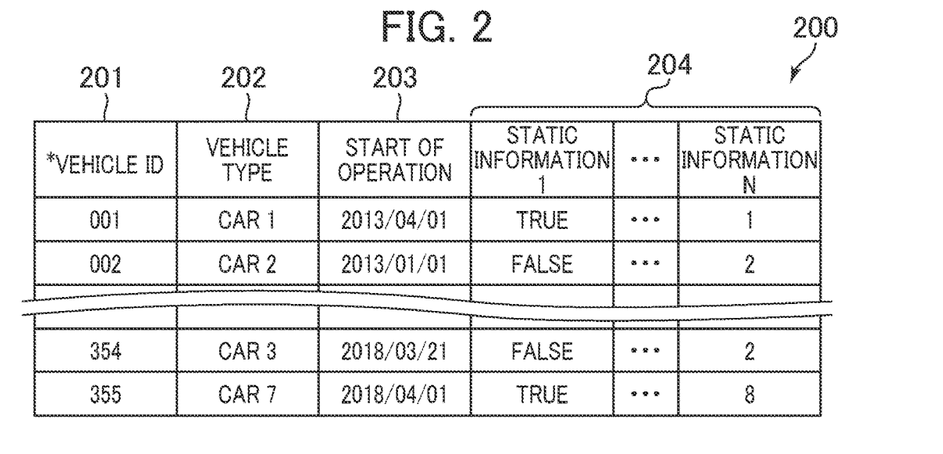
FIG. 2 is a drawing illustrating an example of a vehicle table according to the first embodiment.

FIG. 2 illustrates an example of the vehicle table 200. The vehicle table 200 accumulates the fundamental information on a vehicle as a management object, such as a type and start time of operation. The data structure of the vehicle table 200 is a collective entity of records configured with a vehicle ID

201 as a key, a vehicle type 202, start of operation 203, and other static information 204 associated with the vehicle.

The vehicle ID 201 stores an ID for specifying the in-vehicle terminal 170 uniquely. The vehicle type 202 stores a character string that specifies a vehicle type, such as a vehicle type name of the vehicle. The start of operation 203 stores the month and year when the vehicle was brought into operation. The static information 204 stores various kinds of static information associated with a vehicle, in the form of a numerical value, a character string, or a true-false type.

Figure 3:
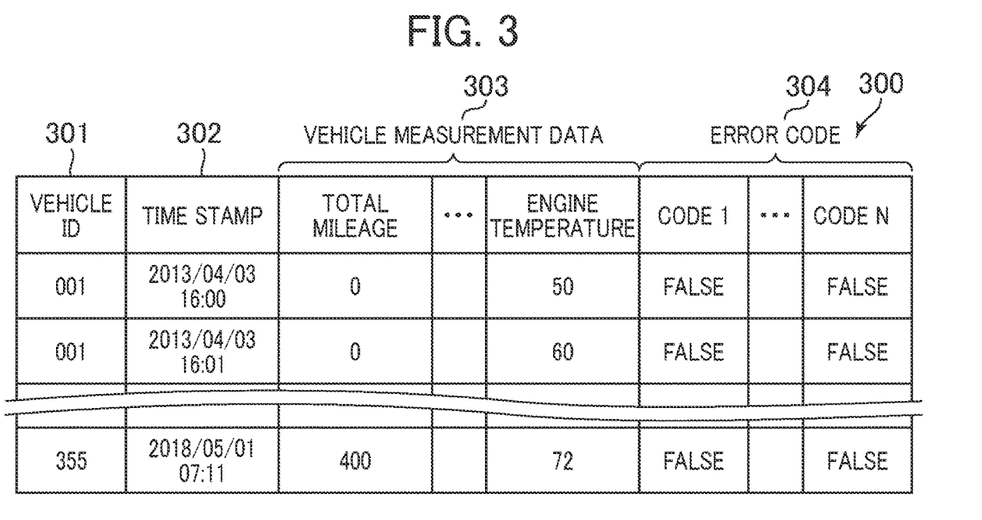
FIG. 3 is a drawing illustrating an example of an operation information table according to the first embodiment.

FIG. 3 illustrates an example of the operation information table 300. The operation information table 300 accumulates the information on the numerical data that is measured inside the vehicle as a management object and the error code that is outputted. Here, the information is periodically sent from the in-vehicle terminal 170. The data structure of the operation information table 300 is a collective entity of records configured with a vehicle ID 301, a time stamp 302, vehicle measurement data 303 configured with multiple columns, such as mileage, engine temperature, and gasoline remaining amount, and an error code 304 configured with columns corresponding to multiple error codes.

The vehicle ID 301 stores a vehicle ID 201. The time stamp 302 stores the time when the corresponding record was acquired. The vehicle measurement data 303 stores the numerical data measured in a vehicle. The error code 304 stores the state of whether or not the error corresponding to each column has occurred, in the true-false type.

Figure 4:
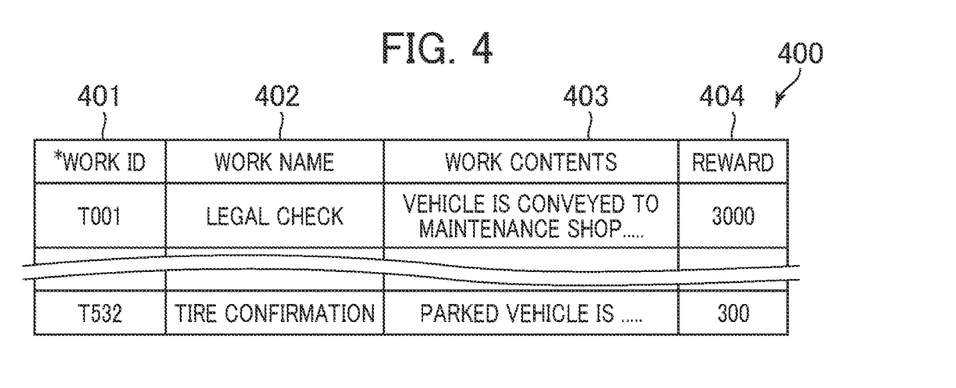
FIG. 4 is a drawing illustrating an example of a work contents table according to the first embodiment.

FIG. 4 illustrates an example of the work contents table 400. The work contents table 400 accumulates the information on the work contents that is related to the maintenance of a vehicle and that is performed by the user of the vehicle. The data structure of the work contents table 400 is a collective entity of records configured with a work ID 401 as a key, a work name 402, work contents 403, and a reward 404.

The work ID 401 stores a character string that specifies the work contents uniquely. The work name 402 stores a character string that indicates the work contents. The work contents 403 store the outline of the work contents described in natural language and/or concrete work contents (details), as a character string for example (support information of the work). For example, the value of the work contents 403 includes "wear check of a tire" and "transportation for a periodic check", for example. The reward 404 stores the contents of a reward that a user obtains when performing the work, in a character string. For example, the value of the reward 404 includes money to receive and a point allotted to the fee of a vehicle.

Figure 5:
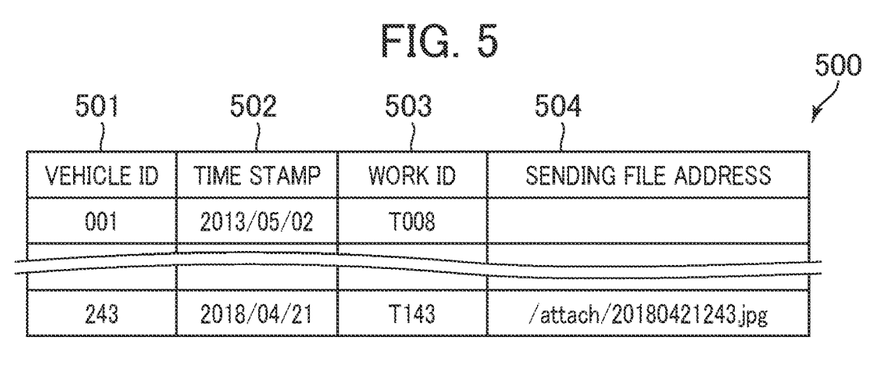
FIG. 5 is a drawing illustrating an example of a work history table according to the first embodiment.

FIG. 5 illustrates an example of the work history table 500. The work history table 500 accumulates the information on work that is written in by the completion processing unit 137 or the external system 150 and that is related to the maintenance of the vehicle performed until now. The data structure of the work history table 500 is a collective entity of records that is configured with a vehicle ID 501, a time stamp 502, a work ID 503, and a sending file address 504.

The vehicle ID 501 stores a vehicle ID 201. The time stamp 502 stores the time when the corresponding record was acquired. The work ID 503 stores a work ID 401. The sending file address 504 stores a character string indicative of the address that specifies uniquely corresponding one of multiple sending files 133 stored in the storage device 130.

The sending file 133 is a collective entity of the data sent from the client terminal 160, the in-vehicle terminal 170, or the external system 150. The sending file 133 is the data acquired from sensors, such as a camera mounted in the client terminal 160, at the time of the work by a user (for example, a photograph of a tire shot in order to check the degree of wear of the tire), and the measurement data measured by a sensor of a vehicle under predetermined conditions and transmitted from the in-vehicle terminal 170.

Figure 6:
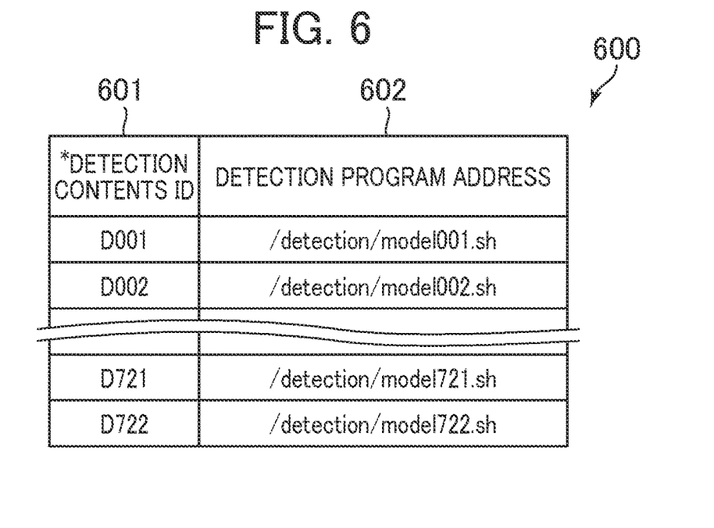
FIG. 6 is a drawing illustrating an example of a detection program table according to the first embodiment.

FIG. 6 illustrates an example of the detection program table 600. The detection program table 600 accumulates the information to associate the detection contents with the detection program (algorithm) for detection. The data structure of the detection program table 600 is a collective entity of records configured with a detection contents ID 801 as a key and a detection program address 602.

The detection contents ID 801 store a character string to specify uniquely the detection contents (algorithm) by means of the detection unit 134. The detection program address 602 stores a character string indicative of the address that specifies uniquely the detection program (algorithm) related to the detection unit 134.

Figure 7:
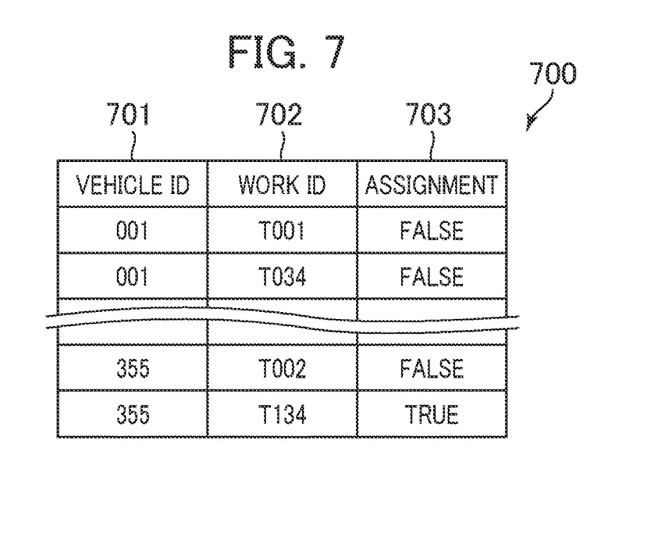
FIG. 7 is a drawing illustrating an example of a required work table according to the first embodiment.

FIG. 7 illustrates an example of the required work table 700. The required work table 700 accumulates the information on the work that is edited by the output unit 136 and the completion processing unit 137 and that is needed currently in each vehicle. The data structure of the required work table 700 is a collective entity of records that is configured with a vehicle ID 701, a work ID 702, and an assignment 703.

The vehicle ID 701 stores a vehicle ID 201. The work ID 702 stores a work ID 401. The assignment 703 stores, in the true-false type, the information indicative of whether the required work corresponding to each record is already assigned to the user.

Figure 8:
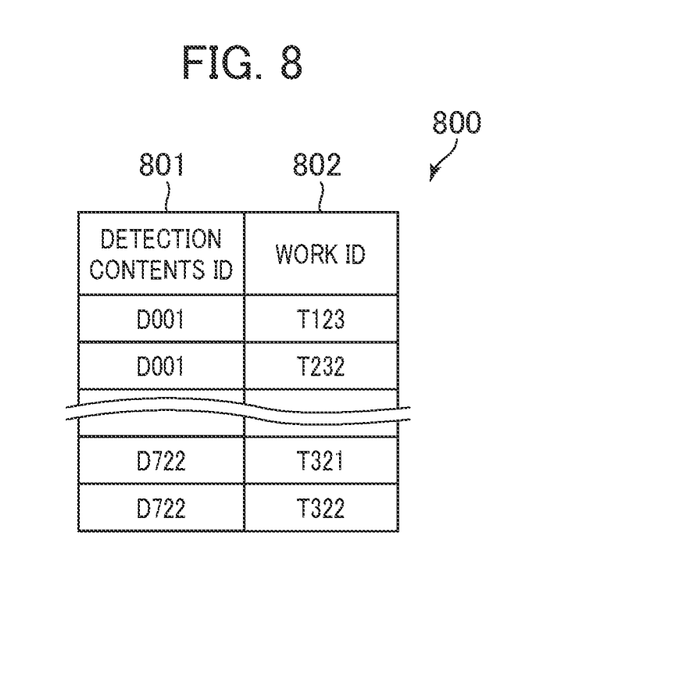
FIG. 8 is a drawing illustrating an example of a detection contents versus work table according to the first embodiment.

FIG. 8 illustrates an example of the detection contents versus work table 800. The detection contents versus work table 800 is an intermediate table that accumulates the correspondence relation of the detection contents and the work requiring maintenance. The data structure of the detection contents versus work table 800 is a collective entity of records configured with detection contents ID 801 and a work ID 802.

The detection contents ID 801 store a detection contents ID 601. The work ID 802 stores a work ID 401.

Figure 9:
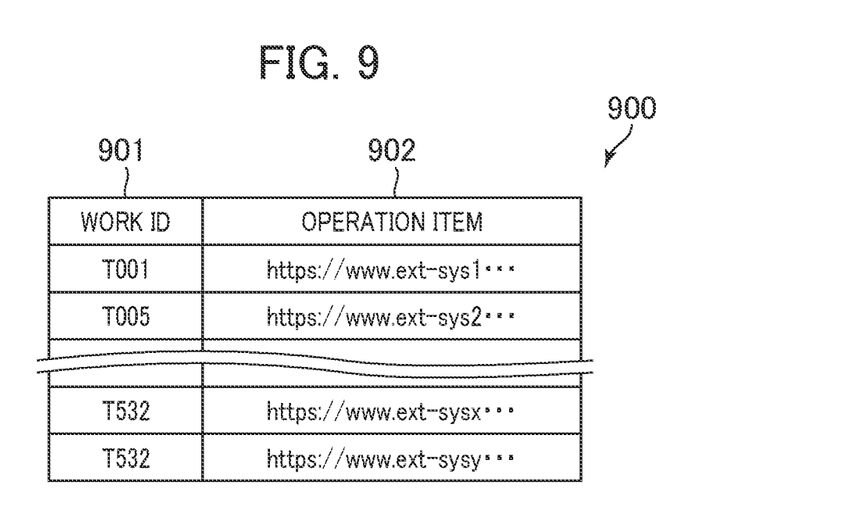
FIG. 9 is a drawing illustrating an example of an external cooperation table according to the first embodiment.

FIG. 9 illustrates an example of the external cooperation table 900. The external cooperation table 900 is a database that accumulates the information on arrangements of the item that needs to be performed by other person than a user. The data structure of the external cooperation table 900 is a collective entity of records configured with a work ID 901 and an operation item 902.

The work ID 901 stores a work ID 401. The operation item 902 stores a demand to the external system 150 that is described in a form corresponding to an interface through which data is exchanged between the vehicle management system 100 and the external system 150. The operation item 902 includes, for example, a certain specific maintenance reservation to a reservation system of a maintenance shop, a payment procedure of a reward in return for the work by the user of a vehicle, directed for the reward provision system, and a distribution request of the work support software, from a work support software distribution system directed for the client terminal 160 or the in-vehicle terminal 170, to the corresponding client terminal 160 or the corresponding in-vehicle terminal 170.

(D) Example of Flow

Next, processing in the vehicle management system 100 (procedure of a vehicle management method) is explained with reference to drawings. The following explanation assumes that various operations performed in the vehicle management system 100 are realized by a program that the CPU 120 of the vehicle management system 100 runs in the storage device 130. Such a program is comprised of codes for performing various kinds of operations explained in the following.

Figure 10:
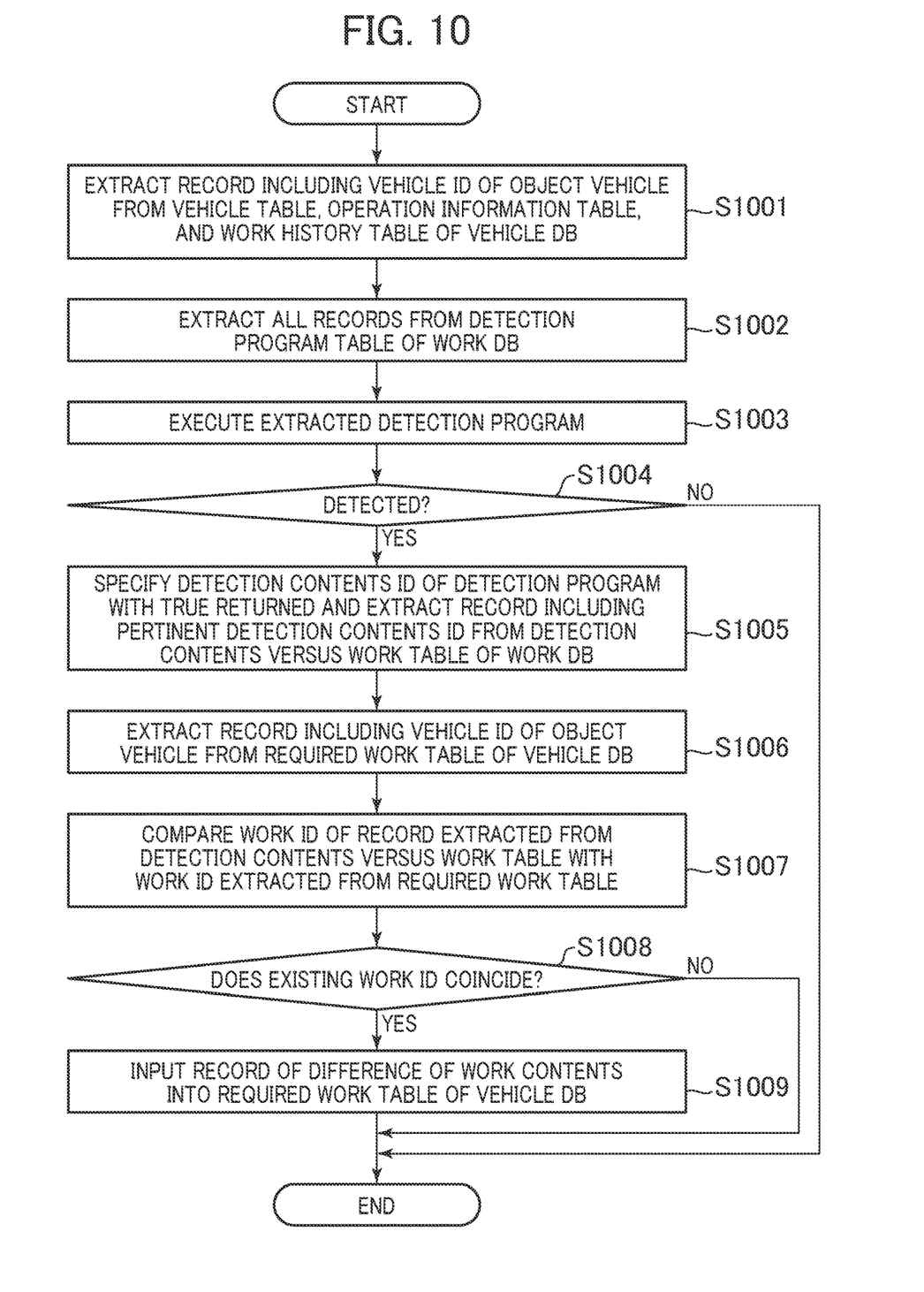
FIG. 10 is a drawing illustrating an example of a flow chart of work specifying processing according to the first embodiment.

FIG. 10 illustrates an example of a flow chart related to work specifying processing in which work requiring maintenance to a vehicle is detected (generated) and work that a user can perform is specified, based on a work history and an operation status. More specifically, an example of the processing related to the specifying unit 135 is illustrated. With the input value of the vehicle ID 201, the work specifying processing is executed periodically, for example, once a day, as batch processing, inputting each value of the vehicle ID 201 associated with all the records that exist in the vehicle table 200.

At Step S1001, using as a key the input value of the vehicle ID 201 (the vehicle ID of an object vehicle), the specifying unit 135 extracts multiple records of which the vehicle ID 201 coincides, in each of the vehicle table 200, the operation information table 300, and the work history table 500 of the vehicle DB 131.

At Step S1002, the specifying unit 135 extracts all the records from the detection program table 600 of the work DB 132.

At Step S1003, with the inputs of the multiple records of the vehicle table 200, the operation information table 300, and the work history table 500 that have been outputted at Step S1001, the specifying unit 135 runs the detection program (the detection unit 134) uniquely associated with each of the value of the detection program address 602 in multiple records in the detection program table 600 outputted at Step S1002, and obtains the output of a true-false type to each of the multiple records concerned. Then, the specifying unit 135 extracts a column of the detection contents ID 801 in the multiple records in the detection program table 600 outputted at Step S1002, and combines the column with the output of the detection unit 134.

Here, there is a detection program (algorithm) that detects the necessity for a legal check, as an example of the detection unit 134. In such a detection program, for example, among the start of operation 203 in the vehicle table 200 and the time stamp 502 of the record corresponding to the work ID 401 corresponding to the legal check defined in advance in the work history table 500, the maximum numerical value, namely, the nearest one is compared with the present time. When the difference exceeds two years, "True" is returned; otherwise, "False" is returned.

As another example of the detection unit 134, there is a detection program that urges the periodic check of a tire. In such a detection program, for example, among the time stamp 502 of the record corresponding to the work ID 401 corresponding to the fixed tire check defined in advance in the work history table 500, the maximum numerical value, namely, the nearest one is compared with the present time. When the difference exceeds three months, "True" is returned; otherwise, "False" is returned.

In the above-described example, the column of the record of the vehicle table 200, the column of the work history table 500, and their combination are set as the input. However, the record of the operation information table 300 and the combination thereof may be added to the above.

In addition to the above-described processing according to the rule base, the detection based on image processing technology and machine learning technology for example may be performed, such that the above-described periodic check operation of a tire is executed by a user and the degradation of a tire is detected from the picture of the tire accumulated as the sending file 133 as the result.

At Step S1004, the specifying unit 135 determines whether the work requiring the maintenance is detected. More specifically, the specifying unit 135 refers to the value of the true-false type associated with the detection contents ID 801 in the multiple records that are the outputs at Step S1003, and moves the processing to Step S1005 when "True" is included, and terminates the work specifying processing when all are "False."

At Step S1005, the specifying unit 135 refers to the value of the true-false type associated with the detection contents ID 801 in the multiple records that are the outputs at Step S1003, extracts the value of one or more detection contents IDs 801 of which the value concerned is "True", and extracts multiple records corresponding to the value extracted from the detection contents versus work table 800 of the work DB 132.

At Step S1006, using as a key the value of the vehicle ID 201 given as the input at Step S1001, the specifying unit 135 extracts, from the required work table 700, multiple records of which the vehicle ID 701 of the required work table 700 of the vehicle DB 131 coincides.

At Step S1007, the specifying unit 135 compares the value of the work ID 802 of the multiple records extracted at Step S1005 with the value of the work ID 702 of the multiple records extracted at Step S1006.

At Step S1008, the specifying unit 135 determines whether the work ID 802 extracted at Step S1005 and the work ID 702 extracted at Step S1006 coincide (whether the existing work ID coincides or not?). When it is determined they coincide, the specifying unit 135 moves the processing to Step S1009, otherwise, the specifying unit 135 terminates the work specifying processing.

At Step S1009, the specifying unit 135 specifies a record (a record of the difference of the work contents) that exists in the value of the work ID 802 of the multiple records extracted at Step S1005 and that does not exist in the value of the work ID 702 of the multiple records extracted at Step S1006, and inputs (adds) the specified record to the required work table 700 of the vehicle DB 131.

More specifically, the specifying unit 135 combines the value of the vehicle ID 201 given as the input at Step S1001, the value of the work ID 401 specified at Step S1008, and the value of "False", and writes the combined values to the required work table 700, then terminates the work specifying processing.

Figure 11:
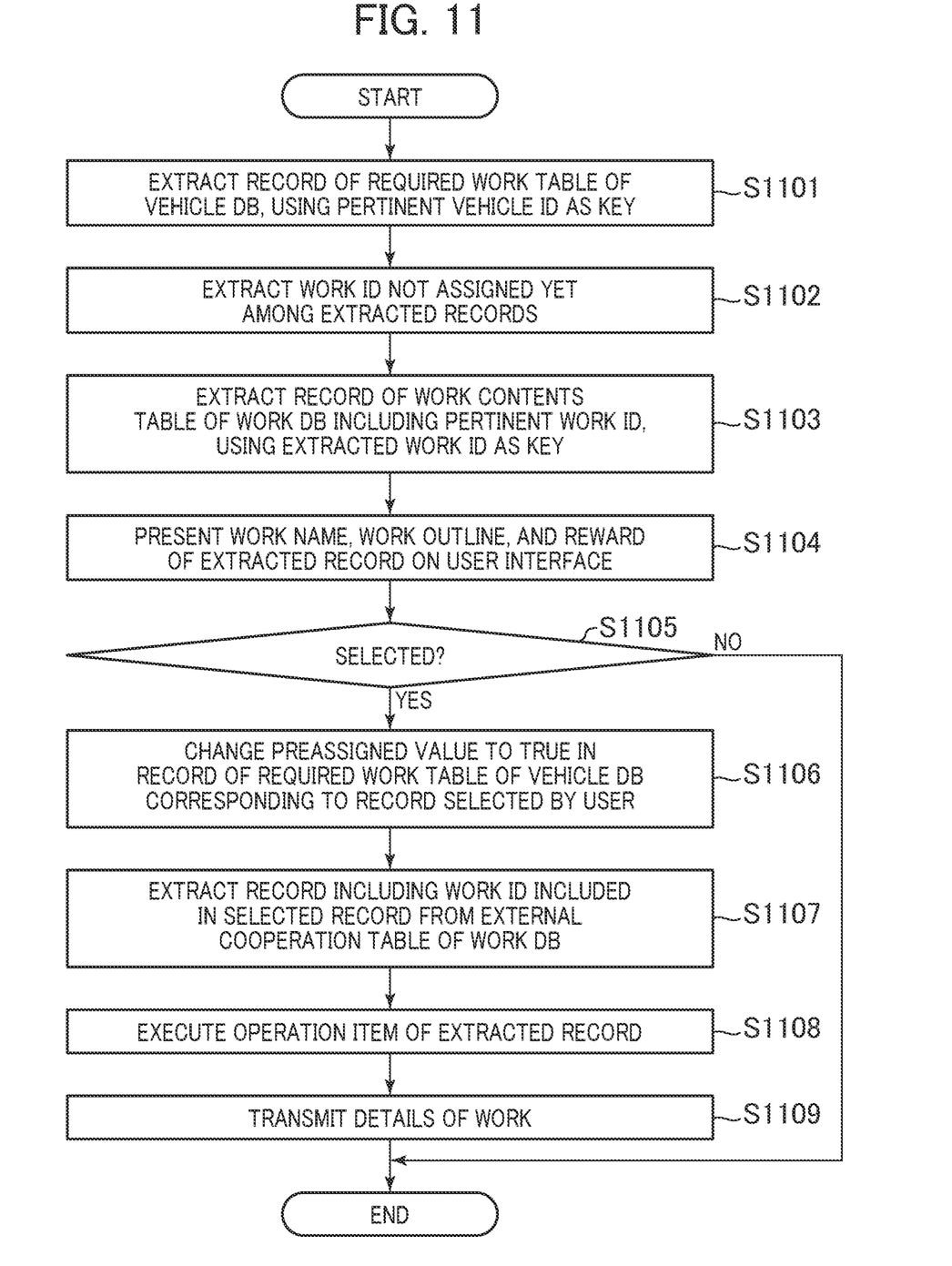
FIG. 11 is a drawing illustrating an example of a flow chart of work presentation arranging processing according to the first embodiment.

FIG. 11 illustrates an example of a flow chart related to the work presentation arranging processing that provides an interface to present concrete work to a user and to select whether the work presented is performed, and that actually performs various arrangements for the work. More specifically, FIG. 11 illustrates an example of processing related to the output unit 136. The work presentation arranging processing are executed, for example, when a user transmits the reference query of a list of the work requiring maintenance in a specific vehicle, from the client terminal 160 to the vehicle management system 100 via the network 140.

An example of the trigger of the work presentation arranging processing is to provide the above-described interface accompanying the reservation system of the vehicle, when a user performs reservation to use a specific vehicle from the client terminal 160. Independently of the reservation to use a vehicle, the above-described interface may be provided, triggered by activation of a car navigation.

At Step S1101, using as a key the value of the specific vehicle ID 201 (the pertinent vehicle ID) included in the reference query as a trigger of the execution, the output unit 136 extracts multiple records of the required work table 700 of the vehicle DB 131.

At Step S1102, the output unit 136 extracts multiple records of which the value of the assignment 703 is "False" (the work ID 702 which is not yet assigned), among the records extracted at Step S1101.

At Step S1103, using as a key the work ID 702 of the multiple records extracted at Step S1102, the output unit 136 extracts multiple records from the work contents table 400 of the work DB 132.

At Step S1104, with respect to the items corresponding to each of the work name 402, the work contents 403, and the reward 404 of the multiple records extracted at Step S1103, and the multiple records concerned, the output unit 136 presents a user interface for a user to choose whether to perform the presentation contents, to the client terminal 160 via the network 140.

Here, the output unit 136 may output the information (for example, a work name, the outline of the work) for entrusting the response of the work specified by the specifying unit 135 to a person who is not a mechanic of a vehicle, for example. In this case, for example, a person who is not a mechanic of a vehicle can perform the outputted work on behalf of the mechanic, mitigating the work that the mechanic performs.

For example, the output unit 136 may transmit the information (for example, a user interface) for receiving whether to perform the work or not, to the in-vehicle terminal 170 of a vehicle or the client terminal 160. In this case, it is possible for the user to give easily the response to the effect that the work may be performed, for example.

At Step S1105, the output unit 136 determines whether the user makes selection to perform the work via the client terminal 160, in the presentation contents at Step S1104. When it is determined that at least one is selected, the output unit 136 moves the processing to Step S1106, and when it is determined that none is selected, the output unit 136 terminates the work presentation arranging processing.

At Step S1106, the output unit 136 updates to "True" the value of the assignment 703 in the record of the required work table 700 of the vehicle DB 131, the record being specified by the combination of the work ID 401 corresponding to the work and the value of the specific vehicle ID 201, selected by the user at Step S1104.

In this way, based on the information to the effect that the work specified by the specifying unit 135 is performed (for example, it may be the information to the effect that the work may be performed, received via a user interface or it may be the information to the effect that the work may be performed, received by telephone), the output unit 136 updates the information related to the work (for example, the assignment 703 of the required work table 700) so as to indicate that the work concerned is due to be performed. According to such a configuration, for example, in the case where one vehicle is used by multiple users, it is possible to distinguish whether the work is already planned to be performed by one of the users. The output unit 136 may store a user ID that can identify a user in addition to updating to "True."

At Step S1107, using as a key the value of the work ID 401 corresponding to the work selected by the user at Step S1105, the output unit 136 extracts multiple records of the external cooperation table 900 of the work DB 132.

At Step S1108, the output unit 136 executes the contents of the operation item 902 in the multiple records extracted at Step S1107. In the execution, the information extracted from the vehicle DB 131 may be added.

In this way, based on the external cooperation information that specifies the work and the demand to the external system performing the processing related to the work concerned (for example, the external cooperation table 900), and the information to the effect that the work specified by the specifying unit 135 is performed, the output unit 136 outputs instructions to the external system that performs the work concerned, so as to perform the processing related to the work concerned. Therefore, a series of processing related to the work will be performed completely.

At Step S1109, the output unit 136 transmits the details of the work contents 403 of the selected work (for example, the detailed work procedure according to a picture and a moving image for example, software for supporting the work, and the destination of the car navigation), to the client terminal 160 and/or the in-vehicle terminal 170 of the vehicle corresponding to the value of the specific vehicle ID 201, and terminates the work presentation arranging processing.

In this way, the output unit 136 transmits the support information for supporting the work (for example, the work contents 403), to the in-vehicle terminal 170 or the client terminal 160. Therefore, it is possible for the user to perform the work easily, for example.

Figure 12:
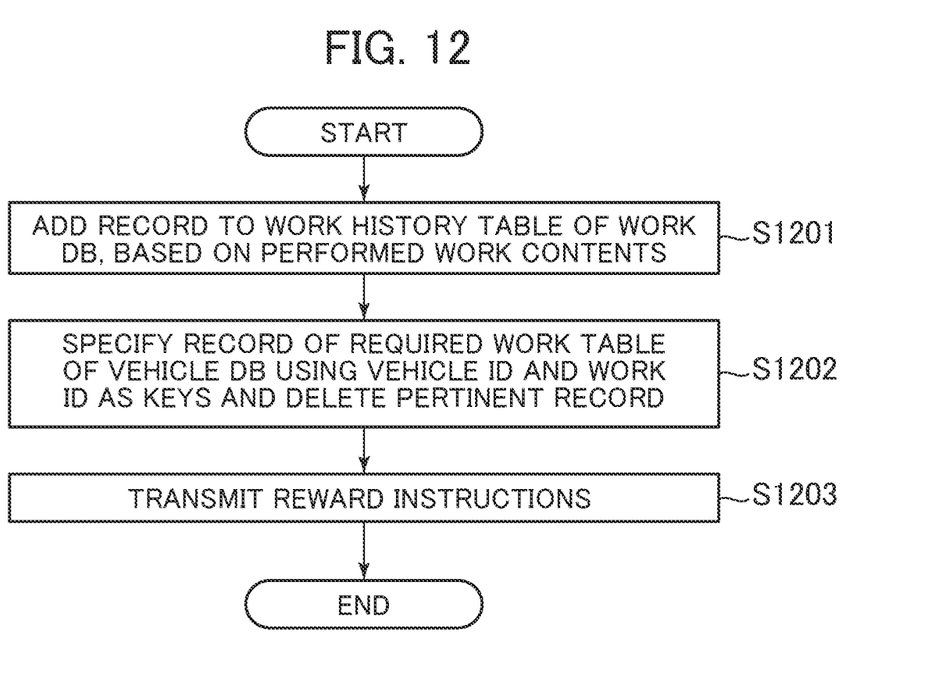
FIG. 12 is a drawing illustrating an example of a flow chart of work ending processing according to the first embodiment.

FIG. 12 illustrates an example of a flow chart related to work ending processing to update a DB after confirming that the user has ended the work. More specifically, FIG. 12 illustrates an example of processing related to the completion processing unit 137. The work ending processing is executed, for example, when a user transmits the information indicative of the completion of the concrete work of a specific vehicle and the attached file in connection with the work, from the external system 150 or the client terminal 160 to the vehicle management system 100 via the network 140.

As an example of the trigger in the work ending processing, in the case of the work for checking wear of a tire, serving as the trigger is executing photography of a tire through a software for guiding the photography and work, distributed to the client terminal 160 from the vehicle management system 100 or the external system 150, notifying the vehicle management system 100 from the software concerned that the work has been performed, and sending the shot picture.

As an example of the trigger in the work ending processing, in the case of transportation of a vehicle to a maintenance shop, serving as the trigger is notifying the vehicle management system 100, from the reservation system of the maintenance shop corresponding to one of the external systems 150, of the fact that the vehicle has come to the maintenance shop and that the maintenance to the vehicle has been performed.

At Step S1201, the completion processing unit 137 adds to the work history table 500 of the work DB 132 the record combining the value of the vehicle ID 501 (the specific vehicle ID) included in the end query serving as a trigger of execution, the value of the time stamp 502 of time at which data is received, and the value of the work ID 503.

At Step S1202, using as a key the value of the vehicle ID 501 and the value of the work ID 503 that are included in the end query serving as a trigger of execution, the completion processing unit 137 specifies the record of the required work table 700 of the vehicle DB 131 and deletes the record.

At Step S1203, the completion processing unit 137 transmits reward instructions to the client terminal 160 of the user who performed the work and/or the in-vehicle terminal 170 and terminates the work ending processing.

In this way, the detection unit 134 detects the work related to the maintenance to a vehicle for every vehicle, based on the vehicle information (for example, the vehicle DB 131) related to the vehicle, the specifying unit 135 specifies the predetermined work out of the work detected by the detection unit 134, based on the work information (for example, the work DB 132) and stores the information related to the specified work (for example, a record of the required work table 700), and the completion processing unit 137 deletes the information related to the work stored, when the information (for example, the end query) that indicates the completion of the work specified by the specifying unit 135 is received. According to such processing it is possible to manage appropriately the predetermined work related to the maintenance of a vehicle.

In the present embodiment, by arranging for a user to perform the plain work and arranging for a mechanic to perform the very professional work, it is possible to improve the productivity of the mechanic and to reduce the energy loss in the society as a whole.

(2) Other Embodiments

In the above-described embodiment, the case where the present invention is applied to the vehicle management system is described. However, the present invention is widely applicable not only to the above-described case but also to various systems, equipment, methods, and programs.

In the above-described embodiment, the case where the work specifying processing is executed periodically is described. However, the present invention is not restricted to the case, and it is also preferable to execute the work specifying processing based on the operation by the user (for example, at the timing at which ignition is turned on). In this case the work specifying processing may be performed to the vehicle specified (operated), may be performed to all the vehicles, or may be performed to one or more vehicles that are registered beforehand.

In the above-described embodiment, for the sake of convenience in explanation, various kinds of data are explained using an XX table and an XX file. However, the data structure is not restricted to the case and may be expressed as XX information, for example.

The information, including a program, a table, and a file, that realizes each function in the above-described explanation can be stored in storing devices, such as a memory, a hard disk, an SSD (a Solid State Drive), or in recording media, such as an IC card, an SD card, and a DVD.

The configuration described above may be changed, rearranged, combined, or may be omitted suitably, in the range which does not deviate from the gist of the present invention.

According to the configuration described above, it is possible to realize a vehicle management system with high sustainability.

LIST OF REFERENCE SIGNS

100 . . . vehicle management system, 110 . . . communication device, 120 . . . CPU, 130 . . . storage device, 140 . . . network, 150 . . . external system, 160 . . . client terminal, 170 . . . in-vehicle terminal.

The invention claimed is:

1. A vehicle management system comprising:
a plurality of vehicles each having a plurality of sensors;
a plurality of mobile devices;
a computer coupled to the plurality of vehicles and the plurality of mobile devices over a network,
wherein the computer is programmed to:
store work history information for each vehicle in association with the respective vehicle ID, the work history information indicating a time stamp of completed work, a work ID indicating what work was performed and a file indicating the completed work,
store a plurality of records of work information, each record including a work ID, a work name, work contents indicating the content of the work and a reward amount for completion of the work,
store a plurality of programs that detect whether work needs to be performed on a respective vehicle,
automatically and periodically obtain information from the sensors of each vehicle, which indicate states of the vehicles and store the information in association with respective car identifications (IDs),
execute each of the plurality of programs for each of the plurality of vehicles using the respective obtained information and the work history information of each respective vehicle as inputs and individually store the result of the execution of each program, the result being a true value or a false value and a true value indicating work needs to be performed on a respective vehicle,
receive a picture from a mobile device and determine based on a machine learning analysis whether the picture indicates work needs to be performed and upon determining work needs to be performed, store a true value as a result,
obtain a corresponding work ID for each record having a true result
store, a table, the work ID having the true result, the vehicle ID corresponding to the work ID, and an assignment value of false,
for each record in the table, obtain the work name, work contents indicating the content of the work and a video containing instructions for the work from the plurality of records of work information based on the respective work ID in the table,
send the work name, work contents indicating the content of the work and the video containing instructions to a respective mobile device corresponding to the respective vehicle, and
receive a response from the mobile device that the work is completed for each work ID.

2. The vehicle management system according to claim 1, further comprising in-vehicle terminals coupled to the computer over the network,
wherein the computer transmits the work name, work contents indicating the content of the work and the video containing instructions to a respective in-vehicle terminal.

3. The vehicle management system according to claim 1, wherein the computer is programmed to:
upon receiving a response that the work is completed delete respective record in the table corresponding to the received response.

4. A vehicle management device comprising:
a computer coupled to the plurality of vehicles and the plurality of mobile devices over a network, wherein the computer is programmed to:
store work history information for each vehicle in association with the respective vehicle ID, the work history information indicating a time stamp of completed work, a work ID indicating what work was performed and a file indicating the completed work,
store a plurality of records of work information, each record including a work ID, a work name, work contents indicating the content of the work and a reward amount for completion of the work,
store a plurality of programs that detect whether work needs to be performed on a respective vehicle,
automatically and periodically obtain information from the sensors of each vehicle, which indicate states of the vehicles and store the information in association with respective car identifications (IDs),
execute each of the plurality of programs for each of the plurality of vehicles using the respective obtained information and the work history information of each respective vehicle as inputs and individually store the result of the execution of each program, the result being a true value or a false value and a true value indicating work needs to be performed on a respective vehicle,
receive a picture from a mobile device and determine based on a machine learning analysis whether the picture indicates work needs to be performed and upon determining work needs to be performed, store a true value as a result,
obtain a corresponding work ID for each record having a true result store, a table, the work ID having the true result, the vehicle ID corresponding to the work ID, and an assignment value of false,
for each record in the table, obtain the a work name, work contents indicating the content of the work and a video containing instructions for the work from the plurality of records of work information based on the respective work ID in the table,
send the work name, work contents indicating the content of the work and the video containing instructions to a respective mobile device corresponding to the respective vehicle, and
receive a response from the mobile device that the work is completed for each work ID.

5. A vehicle management method of a vehicle management system including a plurality of vehicles each having a plurality of sensors; a plurality of mobile devices; and a computer coupled to the plurality of vehicles and the plurality of mobile devices over a network, the method comprising:

storing work history information for each vehicle in association with the respective vehicle ID, the work history information indicating a time stamp of completed work, a work ID indicating what work was performed and a file indicating the completed work,
storing a plurality of records of work information, each record including a work ID, a work name, work contents indicating the content of the work and a reward amount for completion of the work,
storing a plurality of programs that detect whether work needs to be performed on a respective vehicle,
automatically and periodically obtaining information from the sensors of each vehicle, which indicate states of the vehicles and store the information in association with respective car identifications (IDs),
executing each of the plurality of programs for each of the plurality of vehicles using the respective obtained information and the work history information of each respective vehicle as inputs and individually store the result of the execution of each program, the result being a true value or a false value and a true value indicating work needs to be performed on a respective vehicle,
receiving a picture from a mobile device and determine based on a machine learning analysis whether the picture indicates work needs to be performed and upon determining work needs to be performed, store a true value as a result,
obtaining a corresponding work ID for each record having a true result
storing, a table, the work ID having the true result, the vehicle ID corresponding to the work ID, and an assignment value of false,
for each record in the table, obtaining the work name, work contents indicating the content of the work and a video containing instructions for the work from the plurality of records of work information based on the respective work ID in the table,
sending the work name, work contents indicating the content of the work and the video containing instructions to a respective mobile device corresponding to the respective vehicle, and
receiving a response from the mobile device that the work is completed for each work ID.

6. The vehicle management system according to claim 1, wherein the execution of each program includes determining whether an amount of time that has lapsed from a respective time stamp in the work history information has exceeded a predetermined threshold.

* * * * *